United States Patent

Minoura

(10) Patent No.: US 6,750,936 B2
(45) Date of Patent: Jun. 15, 2004

(54) DISPLAY DEVICE

(75) Inventor: Kiyoshi Minoura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 5 days.

(21) Appl. No.: 10/230,558

(22) Filed: Aug. 29, 2002

(65) Prior Publication Data

US 2003/0043313 A1 Mar. 6, 2003

(30) Foreign Application Priority Data

Aug. 30, 2001 (JP) ........................................ 2001-261067

(51) Int. Cl.$^7$ ............................................. G02F 1/1343
(52) U.S. Cl. ........................... 349/143; 349/42; 349/43; 257/59; 257/72; 257/66; 257/61; 257/95; 257/139
(58) Field of Search ............................ 349/143, 42–43; 257/59, 61, 66, 72, 95, 139

(56) References Cited

U.S. PATENT DOCUMENTS

| | | | | |
|---|---|---|---|---|
| 5,307,189 A | * | 4/1994 | Nishiki et al. | 349/143 |
| 5,536,933 A | * | 7/1996 | Izumi et al. | 250/208.2 |
| 6,078,368 A | * | 6/2000 | Ichikawa et al. | 349/48 |
| 6,404,465 B1 | * | 6/2002 | Nakayama et al. | 349/39 |
| 6,472,666 B2 | * | 10/2002 | Izumi et al. | 250/370.08 |
| 6,555,422 B1 | * | 4/2003 | Yamazaki et al. | 438/166 |
| 6,624,870 B1 | * | 9/2003 | Greene et al. | 349/153 |

FOREIGN PATENT DOCUMENTS

| | | |
|---|---|---|
| JP | 1-173016 | 7/1989 |
| JP | 4-367826 | 12/1992 |
| JP | 10-288965 | 10/1998 |
| JP | 11-143392 | 5/1999 |

* cited by examiner

*Primary Examiner*—Michael G. Lee
*Assistant Examiner*—Seung H Lee
(74) *Attorney, Agent, or Firm*—Edwards & Angell, LLP; David G. Conlin; George W. Hartnell, III

(57) ABSTRACT

A display device of the present invention includes: a plurality of pixel electrodes defining a plurality of pixels that are arranged in a matrix pattern; optical switching elements electrically connected to the plurality of pixel electrodes, respectively; and scanning signal light emitting elements for emitting dotted light, as scanning signals, to the optical switching elements. The distance between the optical switching element and the scanning signal light emitting element is less than the pixel pitch at which the plurality of pixels are arranged.

8 Claims, 11 Drawing Sheets

DISPLAY DEVICE

BACKGROUND OF THE INVENTION

1. Field of the Invention

The present invention relates to a display device, and more particularly to a display device in which an optical switching element is provided in each of a plurality of pixels.

2. Description of the Background Art

In recent years, various types of display devices have been developed in the art, such as liquid crystal display devices and organic EL (electroluminescence) display devices. Particularly, active matrix type display devices, in which a switching element is provided in each of a plurality of pixels, have been actively developed in the art.

A thin film transistor (TFT) is widely used as a switching element in active matrix type display devices. A plurality of TFTs are formed in a matrix pattern on a TFT substrate. The TFT substrate includes scanning signal lines for applying scanning signals to the TFTs, and data signal lines for applying data signals thereto.

The scanning signal lines and the data signal lines extend in the respective directions that cross each other (typically perpendicular to each other). Therefore, at each intersection therebetween, a scanning signal line and a data signal line, which are made of a conductive material such as a metal, oppose each other via an insulative film therebetween, thus forming a capacitor. Such a capacitor formed at each intersection causes a signal delay, thereby adversely influencing the display.

In order to prevent a signal delay by the formation of such an unnecessary capacitor, it has been proposed in the art to employ, as a switching element, an optical switching element that is turned ON by being irradiated with light.

For example, Japanese Laid-Open Patent Publication No. 1-173016 and Japanese Laid-Open Patent Publication No. 4-367826 each disclose a liquid crystal display device including an optical switching element provided in each pixel, and a scanning signal light emitting element for emitting light as a scanning signal to the optical switching element.

In the liquid crystal display devices disclosed in these publications, a scanning signal light emitting element, which is a linear light emitting element or a linear light guide element having a light emitting element at an end thereof, functions as a scanning signal line in a conventional TFT substrate. Therefore, the unnecessary capacitor as described above is not formed, thereby preventing a signal delay.

However, a display device in which an optical switching element is provided in each pixel as those liquid crystal display devices described above has a problem, so called "crosstalk phenomenon". A crosstalk phenomenon is caused when light emitted from a scanning signal light emitting element that is associated with an optical switching element is incident on a different, unintended optical switching element.

Japanese Laid-Open Patent Publication No. 10-288965 discloses an organic EL display device including a pin hole mask, which transmits only a portion of light emitted from scanning signal light emitting elements that travels straight toward optical switching elements, in order to suppress the occurrence of a crosstalk phenomenon.

However, the present inventor has found that the use of a pin hole mask may not always prevent light from being incident on an unintended optical switching element depending on the arrangement of the optical switching elements and the scanning signal light emitting elements, in which case the occurrence of a crosstalk phenomenon is not suppressed sufficiently.

Moreover, the present inventor has also found that in a display device including a backside light source, e.g., a liquid crystal display device including a backlight, a crosstalk phenomenon may be caused also by light from the backside light source.

SUMMARY OF THE INVENTION

The present invention has been made to solve the problems as set forth above, and has an object to provide a display device capable of displaying an image with a high quality while suppressing the occurrence of a signal delay and a crosstalk phenomenon.

A first display device of the present invention includes: a plurality of pixel electrodes defining a plurality of pixels that are arranged in a matrix pattern; optical switching elements electrically connected to the plurality of pixel electrodes, respectively; and scanning signal light emitting elements for emitting dotted light, as scanning signals, to the optical switching elements, wherein a distance between the optical switching element and the scanning signal light emitting element is less than a pixel pitch at which the plurality of pixels are arranged. Thus, the object set forth above is realized.

A second display device of the present invention includes: a plurality of pixel electrodes defining a plurality of pixels that are arranged in a matrix pattern; optical switching elements electrically connected to the plurality of pixel electrodes, respectively; scanning signal light emitting elements for emitting dotted light, as scanning signals, to the optical switching elements; and a louver provided between the optical switching element and the scanning signal light emitting element. Thus, the object set forth above is realized.

A third display device of the present invention includes: a plurality of pixel electrodes defining a plurality of pixels that are arranged in a matrix pattern; optical switching elements electrically connected to the plurality of pixel electrodes, respectively; scanning signal light emitting elements for emitting dotted light, as scanning signals, to the optical switching elements; and a focusing element provided between the optical switching element and the scanning signal light emitting element for focusing light emitted from the scanning signal light emitting element on a predetermined area. Thus, the object set forth above is realized.

The focusing element may be a lens.

The display device may further include: a backlight provided on a side away from the optical switching element with respect to the scanning signal light emitting element; and a light blocking layer provided on a side of the scanning signal light emitting element that is closer to the backlight.

It is preferred that light emitted from the scanning signal light emitting element is modulated into a predetermined polarized state, and substantially only light that is in the predetermined polarized state is incident on the optical switching element.

A fourth display device of the present invention includes: a plurality of pixel electrodes defining a plurality of pixels that are arranged in a matrix pattern; optical switching elements electrically connected to the plurality of pixel electrodes, respectively; and scanning signal light emitting elements for emitting dotted light, as scanning signals, to the optical switching elements, wherein light emitted from the scanning signal light emitting element is modulated into a predetermined polarized state, and substantially only light that is in the predetermined polarized state is incident on the optical switching element. Thus, the object set forth above is realized.

The display device may further include: a first polarizing element provided between the optical switching element and the scanning signal light emitting element for modulating light emitted from the scanning signal light emitting element into the predetermined polarized state; and a second polarizing element provided between the first polarizing element and the optical switching element and arranged so as to selectively transmit light that is in the predetermined polarized state.

The display device may further include: at least one counter electrode opposing the plurality of pixel electrodes; and a liquid crystal layer provided between the plurality of pixel electrodes and the at least one counter electrode.

The display device may further include: at least one counter electrode opposing the plurality of pixel electrodes; and an organic electroluminescence material layer provided between the plurality of pixel electrodes and the at least one counter electrode.

It is preferred that the display device further includes a light blocking layer provided on a viewer side of the optical switching element.

It is preferred that the scanning signal light emitting element is formed in a dot-like shape.

A fifth display device of the present invention includes: a plurality of pixel electrodes defining a plurality of pixels that are arranged in a matrix pattern; optical switching elements electrically connected to the plurality of pixel electrodes, respectively; and scanning signal light emitting elements, respectively associated with the optical switching elements, for emitting light, as scanning signals, to the optical switching elements, wherein the scanning signal light emitting element is formed in a dot-like shape, and substantially only light that is emitted from one scanning signal light emitting element that is associated with one optical switching element is incident on the optical switching element.

A distance between one optical switching element and one scanning signal light emitting element that is associated with the optical switching element may be less than a pixel pitch at which the plurality of pixels are arranged.

The display device may further include a louver between at least one optical switching element and at least one scanning signal light emitting element that is associated with the at least one optical switching element.

The display device may further include a focusing element between at least one optical switching element and at least one scanning signal light emitting element that is associated with the at least one optical switching element for focusing light emitted from the at least one scanning signal light emitting element on a predetermined area.

The focusing element may be a lens.

The display device may further include: a backlight provided on a side away from the optical switching element with respect to the scanning signal light emitting element; and a light blocking layer provided on a side of the scanning signal light emitting element that is closer to the backlight.

It is preferred that light emitted from each scanning signal light emitting element is modulated into a predetermined polarized state, and substantially only light that is in the predetermined polarized state is incident on one optical switching element that is associated with the scanning signal light emitting element.

The display device may further include: a first polarizing element provided between at least one optical switching element and at least one scanning signal light emitting element that is associated with the at least one optical switching element for modulating light emitted from the at least one scanning signal light emitting element into the predetermined polarized state; and a second polarizing element provided between the first polarizing element and the at least one optical switching element and arranged so as to selectively transmit light that is in the predetermined polarized state.

The display device may further include: at least one counter electrode opposing the plurality of pixel electrodes; and a liquid crystal layer provided between the plurality of pixel electrodes and the at least one counter electrode.

The display device may further include: at least one counter electrode opposing the plurality of pixel electrodes; and an organic electroluminescence material layer provided between the plurality of pixel electrodes and the at least one counter electrode.

It is preferred that the display device further includes a light blocking layer provided on a viewer side of the optical switching element.

Functions of the present invention will now be described.

In the first display device of the present invention, the distance between the optical switching element and the scanning signal light emitting element is less than the pixel pitch at which the plurality of pixels are arranged, thereby preventing light emitted from a scanning signal light emitting element in one pixel from being incident on an unintended optical switching element in an adjacent pixel. Thus, the occurrence of a crosstalk phenomenon is suppressed, and an image is displayed with a high quality.

The second display device of the present invention includes a louver provided between the optical switching element and the scanning signal light emitting element, whereby light that is emitted obliquely from the scanning signal light emitting element is blocked by the louver. Therefore, light that is emitted obliquely from a scanning signal light emitting element in one pixel is prevented from being incident on an unintended optical switching element in an adjacent pixel. Thus, the occurrence of a crosstalk phenomenon is suppressed, and an image is displayed with a high quality.

The third display device of the present invention includes a focusing element provided between the optical switching element and the scanning signal light emitting element for focusing light emitted from the scanning signal light emitting element on a predetermined area. Thus, light emitted from the scanning signal light emitting element is focused on the predetermined area. Therefore, light emitted from a scanning signal light emitting element in one pixel is prevented from being incident on an unintended optical switching element in an adjacent pixel. Thus, the occurrence of a crosstalk phenomenon is suppressed, and an image is displayed with a high quality.

In the fourth display device of the present invention, light emitted from the scanning signal light emitting element is modulated into a predetermined polarized state, and substantially only light that is in the predetermined polarized state is incident on the optical switching element. Therefore, light that is not in the predetermined polarized state is prevented from being incident on the optical switching element. Thus, the occurrence of a crosstalk phenomenon due to light that is not from the scanning signal light emitting element (e.g., light from a backlight in a liquid crystal display device) is suppressed, and an image is displayed with a high quality.

In the fifth display device of the present invention, the scanning signal light emitting element is formed in a dot-like shape, and substantially only light that is emitted from a scanning signal light emitting element that is associated with an optical switching element is incident on the optical switching element. Therefore, the power supplied to the scanning signal light emitting element is efficiently used as scanning signal light, thereby reducing the power consumption. Moreover, light emitted from unintended scanning signal light emitting elements (light emitting elements other than the scanning signal light emitting element that is associated with the optical switching element) will not be incident on the optical switching element, thereby suppressing the occurrence of a crosstalk phenomenon.

The present invention provides a display device capable of displaying an image with a high quality while suppressing the occurrence of a signal delay and a crosstalk phenomenon. The present invention can suitably be used with a liquid crystal display device or an organic EL display device.

DETAILED DESCRIPTION OF THE PREFERRED EMBODIMENTS

Figure 1:
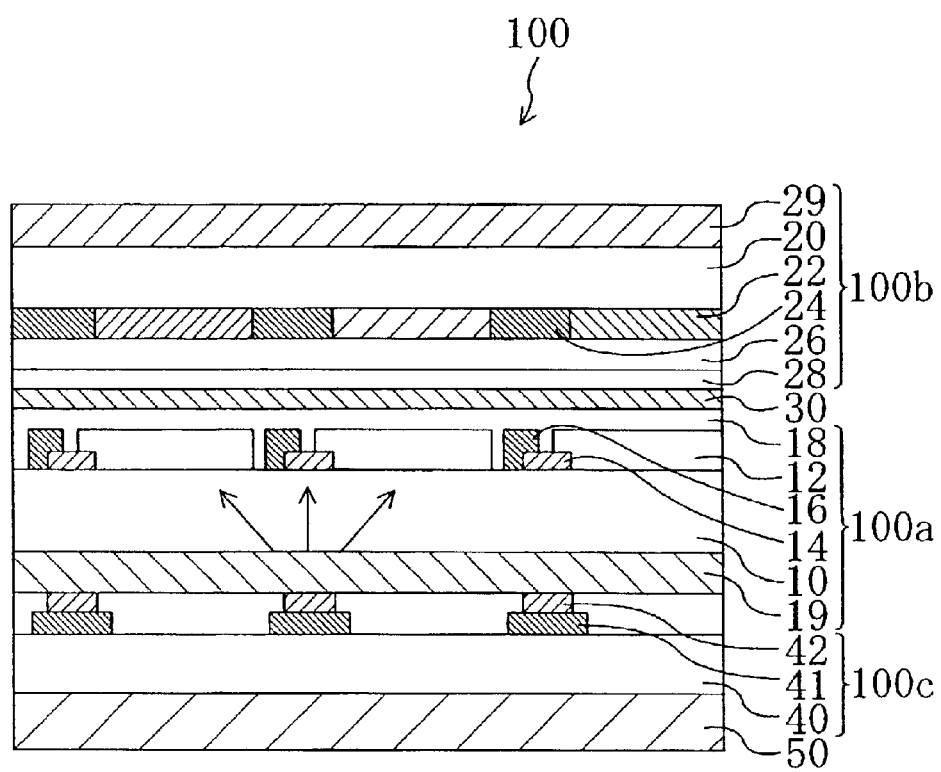
FIG. 1 is a cross-sectional view schematically illustrating a liquid crystal display device 100 of Embodiment 1 of the present invention.

The present inventor has conducted an in-depth study on the use of an optical switching element as a switching element to be provided in each pixel, and has found that it is preferred that the optical switching element and the scanning signal light emitting element are sufficiently separated from each other. This will be discussed in greater detail below.

For example, in a case where organic EL elements are used as the scanning signal light emitting elements, scanning signal lines are required for applying scanning signals to the organic EL elements. In such a case, the scanning signal lines and data signal lines for applying data signals to optical switching elements are provided so as to cross each other, thereby forming a capacitor at each intersection therebetween. Therefore, a signal delay may occur due to such a capacitor, thereby adversely influencing the display quality. In order to prevent the adverse influence of a signal delay, a large distance can be provided between the data signal lines and the scanning signal light emitting elements, i.e., the optical switching elements and the scanning signal light emitting elements can be sufficiently separated from each other, so that the capacitance value of a capacitor formed at each intersection therebetween is so small that the adverse influence thereof on the display quality is negligible.

Moreover, although the capacitor as described above is not formed in a case where the scanning signal light emitting element is, for example, a combination of a cold-cathode tube and an optical waveguide, it is still preferred that the optical switching elements and the scanning signal light emitting elements are sufficiently separated from each other. Specifically, it is preferred that the scanning signal light emitting elements are provided on a substrate that is different from a substrate on which the optical switching elements are formed, or on the same substrate on which the optical switching elements are formed, but on a side of the substrate on which the optical switching elements are not formed. By providing the scanning signal light emitting elements in such a manner, the yield of the display device improves.

As described above, it is preferred that the optical switching elements and the scanning signal light emitting elements are sufficiently separated from each other in view of the signal delay suppression and/or the production yield. However, since light emitted from a scanning signal light emitting element generally has a certain angle of divergence (a certain angular distribution), a crosstalk phenomenon is more likely to occur as the distance between the optical switching element and the scanning signal light emitting element is increased.

Japanese Laid-Open Patent Publication No. 10-288965 discloses suppressing a crosstalk phenomenon by providing a pin hole mask between the optical switching elements and the scanning signal light emitting elements, but fails to disclose findings as those above on the distance between the optical switching element and the scanning signal light emitting element. In fact, even if a pin hole mask is used, a crosstalk phenomenon is not suppressed sufficiently in some cases. This is because the essential effect of the use of a pin hole mask is merely a reduction in the size of the scanning signal light emitting element.

Embodiments of the present invention will now be described with reference to the drawings. Note that the present invention is not limited to the embodiments below.

Embodiment 1

FIG. 1 is a cross-sectional view schematically illustrating a liquid crystal display device 100, which is a display device of Embodiment 1 of the present invention. The liquid crystal display device 100 is an active matrix type liquid crystal display device in which a plurality of pixels are arranged in a matrix pattern.

The liquid crystal display device 100 includes a plurality of pixel electrodes 12 defining a plurality of pixels, optical switching elements 14 electrically connected to the pixel electrodes 12, respectively, and scanning signal light emitting elements 42 for emitting dotted light, as scanning signals, to the optical switching elements 14. The distance between the optical switching element 14 and the scanning signal light emitting element 42 is less than the pixel pitch, at which the plurality of pixels are arranged.

The structure of the liquid crystal display device 100 will be described in greater detail with reference to FIG. 1.

The liquid crystal display device 100 includes an active matrix substrate 100a and a color filter substrate 100b opposing each other, with a liquid crystal layer 30 being provided therebetween.

The active matrix substrate 100a includes a transparent substrate (e.g., a glass substrate or a polymer film) 10, the pixel electrodes 12, the optical switching elements 14 electrically connected to the pixel electrodes 12, respectively, and data signal lines (source lines) 16 for supplying data signals to the optical switching elements 14. The pixel electrodes 12 are formed in a matrix pattern on the transparent substrate 10 by using a transparent conductive material (e.g., ITO). The optical switching elements 14 are made of, for example, CdS, Se, ZnO or amorphous Si. When the optical switching element 14 is irradiated with light, electrons and carriers are generated by the optical energy of the light, and thus the resistance value of the optical switching element 14 decreases, whereby the optical switching element 14 is turned into a conductive state, i.e., turned ON.

The color filter substrate 100b is provided on the viewer side of the active matrix substrate 100a, and includes a transparent substrate (e.g., a glass substrate or a polymer film) 20, a color filter layer 22, a light blocking layer 24 and a counter electrode 26. The color filter layer 22, the light blocking layer 24 and the counter electrode 26 are provided on one side of the transparent substrate 20 that is closer to the liquid crystal layer 30. The counter electrode 26 is formed by using a transparent conductive material (e.g., ITO) and, in the present embodiment, is a single common electrode opposing a plurality of pixel electrodes.

Depending on the liquid crystal layer 30 to be used, alignment layers (e.g., horizontal alignment layers) 18 and 28 are provided on one side of the active matrix substrate 100a and the color filter substrate 100b, respectively, that is closer to the liquid crystal layer 30. Moreover, polarizing plates 19 and 29 are provided on the back side (the side opposite to the viewer side) of the active matrix substrate 100a and on the viewer side of the color filter substrate 100b, respectively.

The liquid crystal display device 100 further includes an additional substrate 100c provided on the back side of the active matrix substrate 100a, and a backlight 50 provided on the back side of the substrate 100c.

The substrate 100c includes a transparent substrate (e.g., a glass substrate) 40, a light blocking layer 41 provided on the viewer side of the transparent substrate 40, and the scanning signal light emitting element 42 provided on the light blocking layer 41. The light blocking layer 41 may be, for example, a metal layer (about 100 nm thick) such as an aluminum layer or a silver layer, a black resin layer (about 1 μm thick), or a layered structure of a chromium layer (about 100 nm thick) and a chromium oxide layer (about 100 nm thick).

Figure 2A:
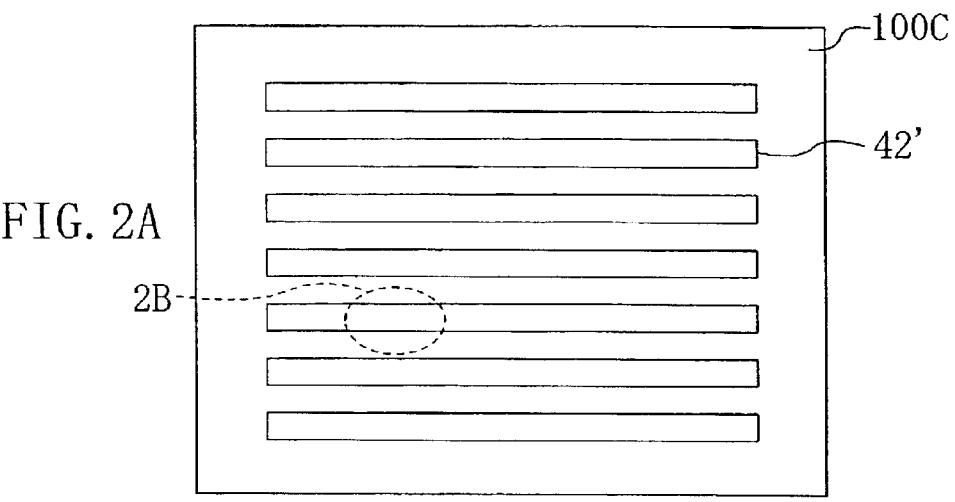
FIG. 2A is a plan view schematically illustrating a substrate 100c provided in the liquid crystal display device 100 of Embodiment 1 of the present invention.
Figure 2B:
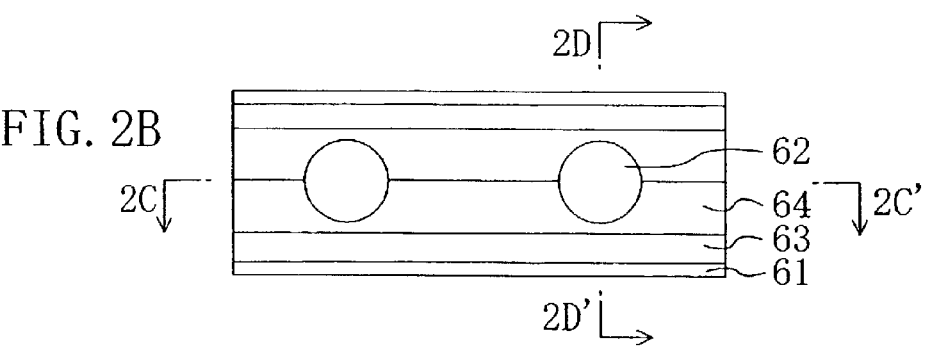
FIG. 2B is an enlarged view illustrating an area 2B encircled by a broken line in FIG. 2A.
Figure 2C:
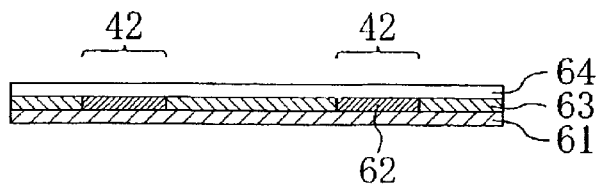
FIG. 2C is a cross-sectional view taken along line 2C–2C' in FIG. 2B.
Figure 2D:
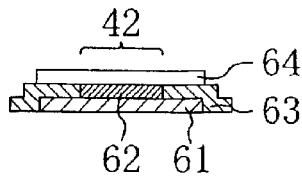
FIG. 2D is a cross-sectional view taken along line 2D–2D' in FIG. 2B.

The scanning signal light emitting element 42 emits dotted light, as a scanning signal, to the optical switching element 14. In the present embodiment, an organic EL (electroluminescence) element formed in a dot-like shape is used as the scanning signal light emitting element 42. The scanning signal light emitting element 42 of the liquid crystal display device 100 of the present embodiment will now be described in greater detail with reference to FIG. 2A to FIG. 2D. FIG. 2A is a plan view schematically illustrating the substrate 100c of the liquid crystal display device 100, FIG. 2B is an enlarged view illustrating an area 2B encircled by a broken line in FIG. 2A, FIG. 2C is a cross-sectional view taken along line 2C–2C' in FIG. 2B, and FIG. 2D is a cross-sectional view taken along line 2D–2D' in FIG. 2B.

The scanning signal light emitting element 42 includes a reflection electrode (e.g., an aluminum layer having a thickness of about 100 nm) 61 formed in a stripe shape on the transparent substrate 40, a light emitting layer (an organic electroluminescence material layer) 62 formed on the reflection electrode 61, an insulating layer 63 formed on the reflection electrode 61, and a transparent electrode (e.g., an ITO layer having a thickness of about 150 nm) 64 formed on the light emitting layer 62 and the insulating layer 63.

The light emitting layer 62 provided between the reflection electrode 61 and the transparent electrode 64 is formed in a dot-like shape at a position corresponding to the optical switching element 14, and the insulating layer 63 is formed so as to surround the dot-shaped light emitting layer 62. The dot-shaped light emitting layer 62, and the reflection electrode 61 and the transparent electrode 64 interposing the light emitting layer 62 therebetween, together function as a scanning signal light emitting element 42. One optical switching element 14 is provided for each pixel, and one scanning signal light emitting element 42 is provided for each optical switching element 14. The stripe-shaped reflection electrode 61 is provided for each row of pixels, for example, and a plurality of scanning signal light emitting elements 42 belonging to one row of pixels together function as a scanning signal line (gate line) 42'.

In the liquid crystal display device 100 having such a structure, first, dotted light, as scanning signals, is emitted from the scanning signal light emitting elements 42 to the optical switching elements 14, whereby the optical switching elements 14 are turned ON in a line sequential manner. In synchronism with this, data signals (display signals) are supplied from the data signal lines 16 to the optical switching elements 14, whereby a voltage according to a data signal is applied to the pixel electrode 12 of each pixel via the optical switching element 14.

A predetermined voltage is applied to the counter electrode 26 opposing a plurality of pixel electrodes 12, and the orientation of liquid crystal molecules of the liquid crystal layer 30 changes according to the voltage (potential difference) between each pixel electrode 12 and the counter electrode 26 so as to modulate light from the backlight 50 according to the change in the orientation, thereby displaying an image.

In the liquid crystal display device 100 of Embodiment 1 of the present invention, the distance between the scanning signal light emitting element 42 and the optical switching element 14 is less than the pixel pitch, at which the plurality of pixels are arranged. In other words, the distance between the scanning signal light emitting element 42 and the optical switching element 14 is less than the arrangement pitch of the optical switching elements 14. This is because the arrangement pitch of the optical switching elements 14, which are provided one in each pixel, is typically substantially equal to the pixel pitch.

With such a structure, light emitted from a scanning signal light emitting element 42 that is associated with one optical switching element 14 is prevented from being incident on other optical switching elements 14 (e.g., an optical switching element adjacent to the intended optical switching element) 14. The reason therefor will now be described with reference to FIG. 3A and FIG. 3B. Note that the following description is for a case where the scanning signal light emitting element 42 emits light in an isotropic manner.

Figure 3A:
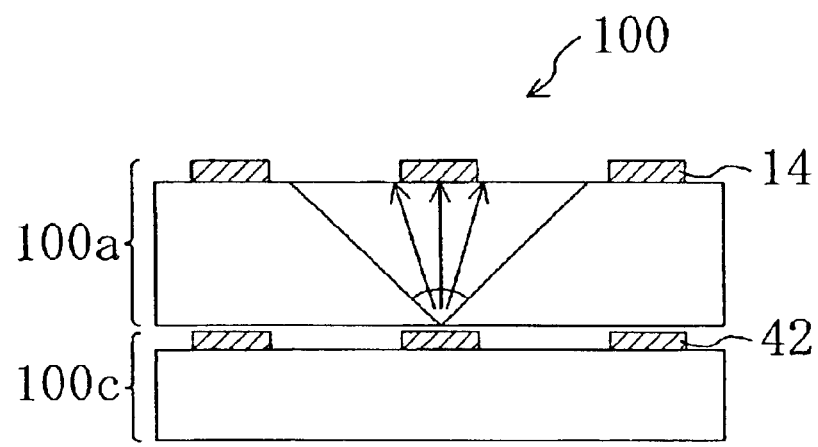
FIG. 3A is a diagram illustrating an angular distribution of light emitted from a scanning signal light emitting element 42 in a case where an air layer exists between the scanning signal light emitting element 42 and an optical switching element 14.

First, a case where an air layer exists between the scanning signal light emitting element 42 and the optical switching element 14 will be described. In such a case, light emitted from the scanning signal light emitting element 42 is distributed across an angular range of about 45° with the center line thereof corresponding to the straight line extending between the scanning signal light emitting element 42 and the optical switching element 14 associated therewith, as illustrated in FIG. 3A. Therefore, if the optical switching elements 14 are arranged so that adjacent optical switching elements 14 are absent in an area within such an angular range, light emitted from the scanning signal light emitting element 42 will not be incident on the adjacent optical switching elements 14. Thus, if the distance between the scanning signal light emitting element 42 and the optical switching element 14 is less than the arrangement pitch of the optical switching elements 14, light is prevented from being incident on adjacent optical switching elements 14.

Figure 3B:
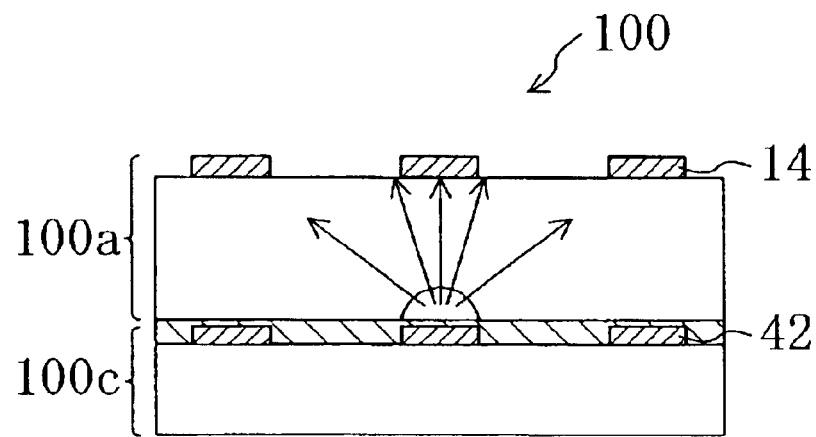
FIG. 3B is a diagram illustrating an angular distribution of light emitted from the scanning signal light emitting element 42 in a case where an air layer does not exist between the scanning signal light emitting element 42 and the optical switching element 14.

Next, a case where an air layer does not exist between the scanning signal light emitting element 42 and the optical switching element 14 will be described. In a case where an air layer does not exist, light emitted from a scanning signal light emitting element 42, which emits light in an isotropic manner, may be incident on unintended optical switching elements 14 adjacent to the optical switching element 14 that is associated with the scanning signal light emitting element 42, as illustrated in FIG. 3B. However, if the intensity of light that is incident on such an adjacent, unintended optical switching element 14 is less than one half of the intensity of light that is incident on the intended optical switching element 14, it can be considered that scanning signal light is substantially not incident on the adjacent optical switching element 14. This is because even if light of such an intensity is incident on an adjacent optical switching element 14, the adjacent optical switching element 14 will not be turned ON.

The light intensity (light intensity per unit area) at a particular point in the plane along which the optical switching elements 14 are arranged is in proportion to $(\cos \theta)_2$, where $\theta$ is the angle of a straight line extending between the particular point and the scanning signal light emitting element 42 with respect to another straight line extending between the scanning signal light emitting element 42 and the optical switching element 14 that is associated with the scanning signal light emitting element 42. Accordingly, the intensity of light emitted from a scanning signal light emitting element 42 that is incident on a point where $\theta>45°$ is less than one half of the intensity of light that is incident on the optical switching element 14 associated with the scanning signal light emitting element 42. Thus, if the optical switching elements 14 are arranged so that adjacent optical switching elements 14 are each located at a point where $\theta>45°$, it can be considered that scanning signal light is substantially not incident on the adjacent optical switching element 14. Therefore, even in a case where an air layer does not exist, if the distance between the scanning signal light emitting element 42 and the optical switching element 14 is less than the arrangement pitch of the optical switching elements 14, light is prevented from being incident on an adjacent optical switching element 14.

In the liquid crystal display device 100 of Embodiment 1 of the present invention, the distance between the optical switching element 14 and the scanning signal light emitting element 42 is less than the pixel pitch at which the plurality of pixels are arranged, whereby light emitted from the scanning signal light emitting element 42 is prevented from being incident on the optical switching element 14 of an adjacent pixel. Thus, the occurrence of a crosstalk phenomenon is suppressed, and an image is displayed with a high quality.

Note that each pixel, in which the optical switching element 14 is provided, typically has a generally rectangular shape, whereby the repeating pitch of the pixels in the longitudinal direction of the pixel may be different from that in the width direction of the pixel. Therefore, the arrangement pitch of the optical switching elements 14 in the longitudinal direction of the pixel may also be different from that in the width direction of the pixel. In order to more reliably suppress the occurrence of a crosstalk phenomenon, it is preferred that the distance between the scanning signal light emitting element 42 and the optical switching element 14 is less than the pixel pitch in the width direction of the pixel. It is possible to provide a large distance between the scanning signal light emitting element 42 and the optical switching element 14 if the width direction of the pixel is parallel to the scanning lines.

Moreover, the liquid crystal display device 100 of Embodiment 1 of the present invention includes the light blocking layer 41, which is provided on one side of the scanning signal light emitting element 42 that is closer to the backlight 50. Thus, light from the backlight 50 is prevented from being incident on the optical switching element 14, thereby preventing the occurrence of a crosstalk phenomenon due to light from the backlight 50.

Furthermore, since each scanning signal light emitting element 42 is formed in a dot-like shape in the liquid crystal display device 100, the power supplied to the scanning signal light emitting element 42 is efficiently used as scanning signal light, thereby reducing the power consumption.

Figure 4:
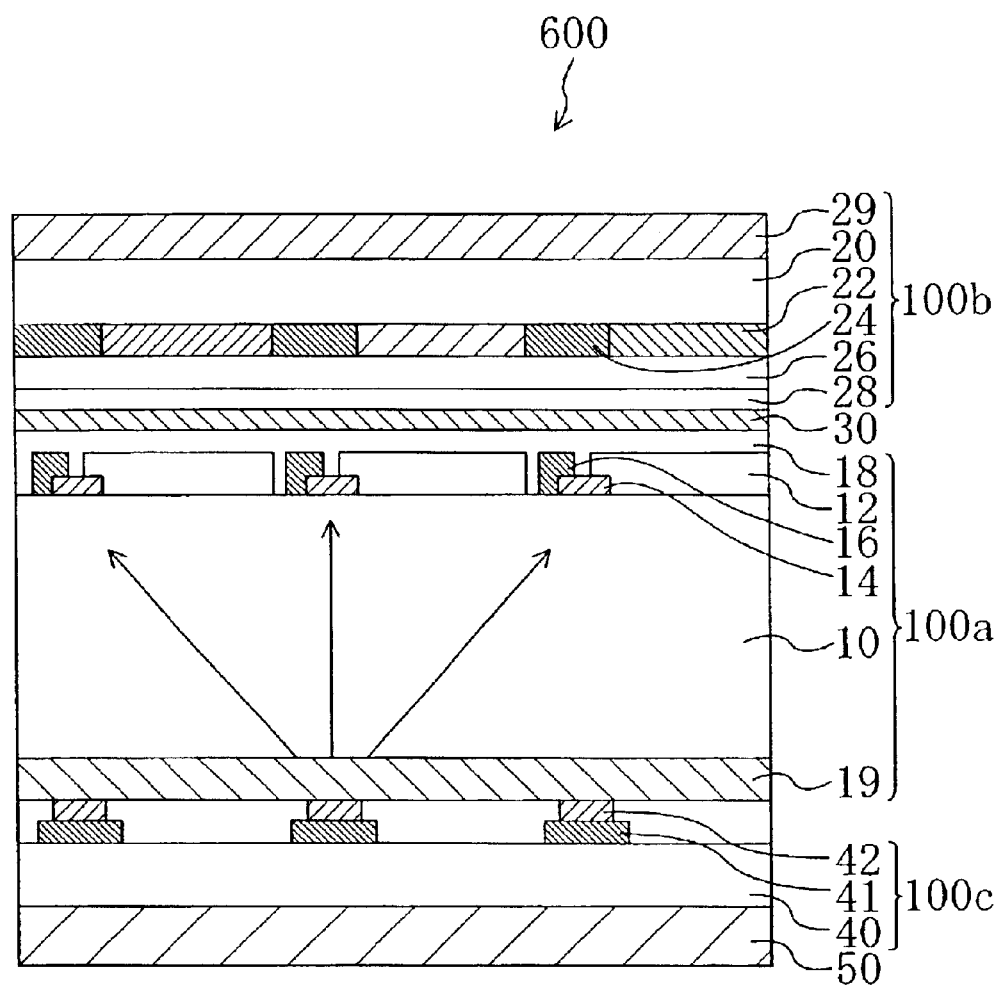
FIG. 4 is a cross-sectional view schematically illustrating a liquid crystal display device 600 in which the distance between the optical switching element 14 and the scanning signal light emitting element 42 is equal to or greater than the pixel pitch.

On the other hand, in a liquid crystal display device 600 in which the distance between the optical switching element 14 and the scanning signal light emitting element 42 is equal to or greater than the pixel pitch, as illustrated in FIG. 4, light emitted from the scanning signal light emitting element 42 may be incident on the optical switching element 14 of an adjacent pixel to cause a crosstalk phenomenon. Note that the liquid crystal display device 600 illustrated in FIG. 4 has substantially the same structure as that of the liquid crystal display device 100 of Embodiment 1, except that the distance between the optical switching element 14 and the scanning signal light emitting element 42 is equal to or greater than the pixel pitch.

Moreover, even when a pin hole mask is provided on the scanning signal light emitting elements, light is incident on adjacent optical switching elements to cause a crosstalk phenomenon if the distance between the optical switching element and the scanning signal light emitting element is equal to or greater than the pixel pitch, because the essential effect of the use of a pin hole mask on the scanning signal light emitting elements is merely a reduction in the size of the scanning signal light emitting element.

Embodiment 2

Figure 5:
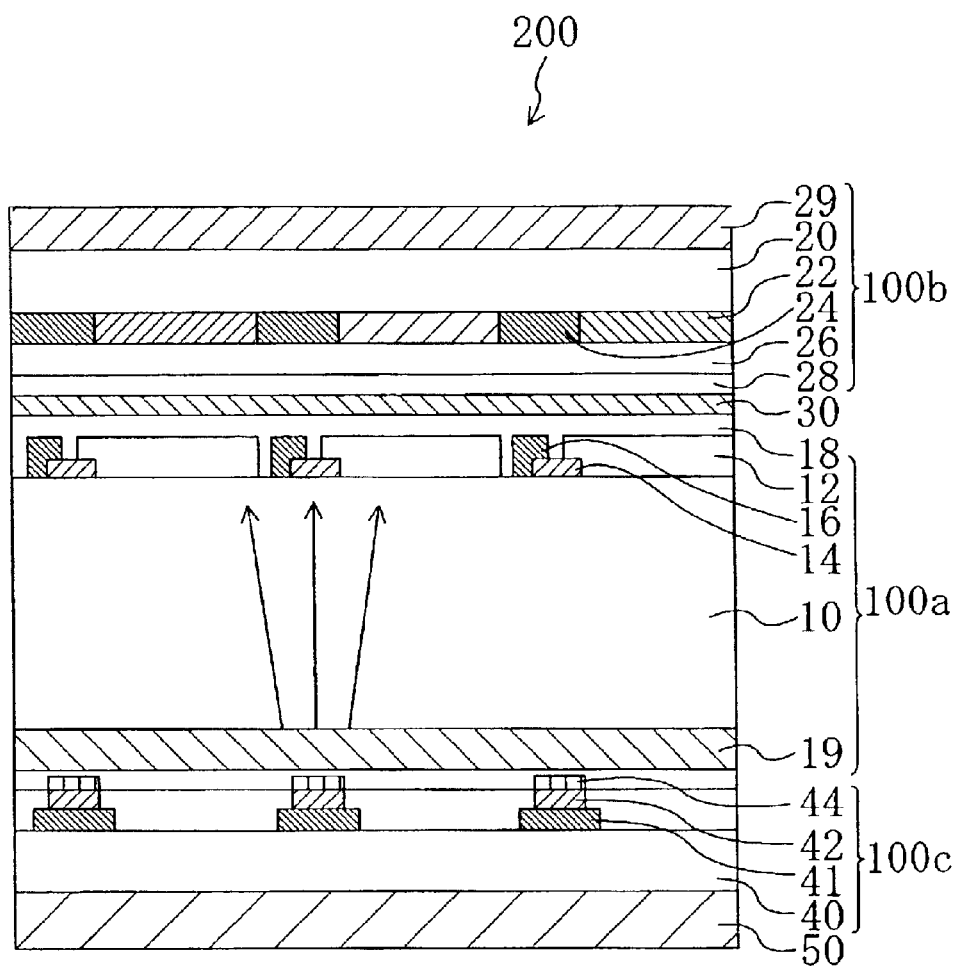
FIG. 5 is a cross-sectional view schematically illustrating a liquid crystal display device 200 of Embodiment 2 of the present invention.

FIG. 5 is a cross-sectional view schematically illustrating a liquid crystal display device 200, which is a display device of Embodiment 2 of the present invention. In FIG. 5, elements having substantially the same functions as those of the liquid crystal display device 100 of Embodiment 1 are denoted by the same reference numerals and will not be further described below. Note that in the liquid crystal display device 200, the distance between the optical switching element 14 and the scanning signal light emitting element 42 may be either less than the pixel pitch (as in the liquid crystal display device 100 of Embodiment 1) or equal to or greater than the pixel pitch.

The liquid crystal display device 200 includes a louver 44 provided between the optical switching element 14 and the scanning signal light emitting element 42. The louver 44 blocks light that is emitted obliquely from the scanning signal light emitting element 42.

The louver 44 is an optical element including a plurality of light blocking walls that are formed generally parallel to the straight line extending between the scanning signal light emitting element 42 and the optical switching element 14 associated therewith. In the present embodiment, the louver 44 is provided immediately on the scanning signal light emitting element 42.

Light that is emitted obliquely from the scanning signal light emitting element 42, i.e., light that is emitted in an inclined direction with respect to the straight line extending between the scanning signal light emitting element 42 and the optical switching element 14 associated therewith, is absorbed and blocked by the light blocking walls of the louver 44. Note that light that is emitted from the scanning signal light emitting element 42 and transmitted through the louver 44 may actually have a slight angular distribution (angle of divergence) according to the arrangement pitch, the height, etc., of the light blocking walls.

As described above, the liquid crystal display device 200 of Embodiment 2 of the present invention includes the louver 44 provided between the optical switching element 14 and the scanning signal light emitting element 42, whereby light that is emitted obliquely from the scanning signal light emitting element 42 is blocked by the louver 44. Therefore, light emitted from a scanning signal light emitting element 42 is prevented from being incident on an unintended optical switching element 14 adjacent to an optical switching element 14 that is associated with the scanning signal light emitting element 42. Thus, the occurrence of a crosstalk phenomenon is suppressed, and an image is displayed with a high quality.

On the other hand, in the liquid crystal display device 600 in which the distance between the optical switching element 14 and the scanning signal light emitting element 42 is equal to or greater than the pixel pitch, and in which no louver is provided, as illustrated in FIG. 4, light emitted from the scanning signal light emitting element 42 may be incident on the optical switching element 14 of an adjacent pixel to cause a crosstalk phenomenon.

Embodiment 3

Figure 6:
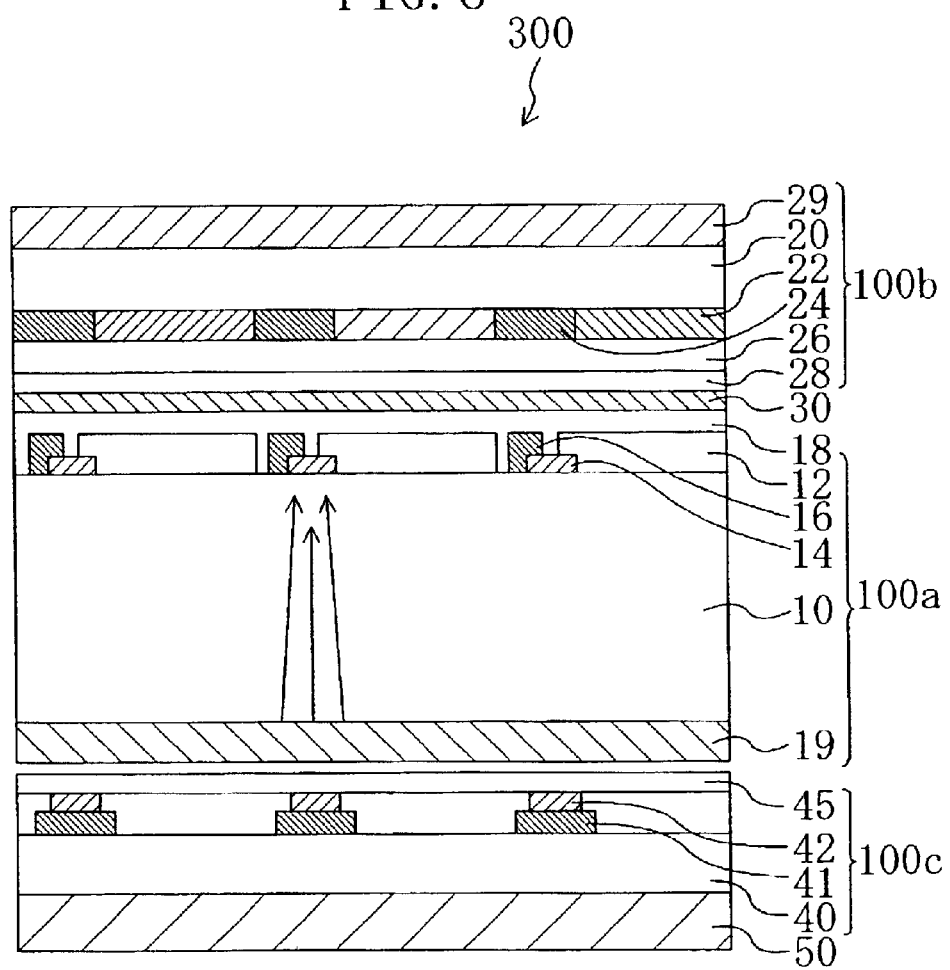
FIG. 6 is a cross-sectional view schematically illustrating a liquid crystal display device 300 of Embodiment 3 of the present invention.

FIG. 6 is a cross-sectional view schematically illustrating a liquid crystal display device 300, which is a display device of Embodiment 3 of the present invention. While the liquid crystal display device 200 of Embodiment 2 includes the louver 44 for blocking light that is emitted obliquely from the scanning signal light emitting element 42, the liquid crystal display device 300 of Embodiment 3 includes a focusing element 45 for focusing light emitted from the scanning signal light emitting element 42 on a predetermined area. In FIG. 6, elements having substantially the same functions as those of the liquid crystal display device 200 of Embodiment 2 are denoted by the same reference numerals and will not be further described below.

The liquid crystal display device 300 of Embodiment 3 includes the focusing element 45 provided between the optical switching element 14 and the scanning signal light emitting element 42. The focusing element 45 focuses light emitted from the scanning signal light emitting element 42 on a predetermined area. In the present embodiment, the focusing element 45 is provided immediately on the scanning signal light emitting element 42 of the substrate 100c.

Figure 7:
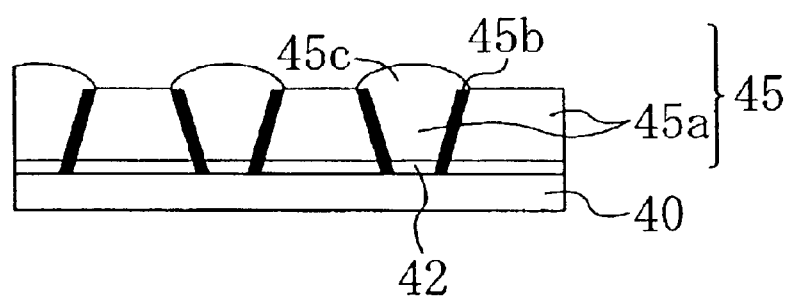
FIG. 7 is a cross-sectional view schematically illustrating a focus lens used as a focusing element 45 provided in the liquid crystal display device 300 of Embodiment 3 of the present invention.

The focusing element 45 may be, for example, a focusing lens 45 including a transparent resin layer 45a, tapered reflection surfaces 45b provided in the transparent resin layer 45a so as to surround the scanning signal light emitting element 42, and lens sections 45c each provided over the scanning signal light emitting element 42 surrounded by the tapered reflection surfaces 45b, as illustrated in FIG. 7.

In a case where the focusing lens 45 as illustrated in FIG. 7 is provided, light that is emitted with a certain angular distribution (i.e., divergently emitted light) from the scanning signal light emitting element 42 is collimated by the tapered reflection surface 45b, and focused on a predetermined area by the lens section 45c. For example, light emitted from the scanning signal light emitting element 42 is focused on an area that coincides with the optical switching element 14 that is associated with the scanning signal light emitting element 42.

As described above, the liquid crystal display device 300 of Embodiment 3 of the present invention includes the focusing element 45 provided between the optical switching element 14 and the scanning signal light emitting element 42 for focusing light emitted from the scanning signal light emitting element 42 on a predetermined area. Therefore, light emitted from a scanning signal light emitting element is focused on a predetermined area, whereby the light emitted from the scanning signal light emitting element is prevented from being incident on an optical switching element in an adjacent pixel. Thus, the occurrence of a crosstalk phenomenon is suppressed, and an image is displayed with a high quality.

On the other hand, in the liquid crystal display device 600 in which the distance between the optical switching element 14 and the scanning signal light emitting element 42 is equal to or greater than the pixel pitch, and in which no focusing element is provided, as illustrated in FIG. 4, light emitted from the scanning signal light emitting element 42 may be incident on the optical switching element 14 of an adjacent pixel to cause a crosstalk phenomenon.

Note that while FIG. 6 illustrates an arrangement where the polarizing plate 19, one of a pair of polarizing plates, is provided on the back side of the active matrix substrate 100a, the polarizing plate 19 may alternatively be provided on the back side of the substrate 100c. In a case where the focusing element 45 as described above is provided, substantially no decrease in the display quality due to light emitted from the scanning signal light emitting element 42 is observed even if the polarizing plate 19 is provided on the back side of the substrate 100c.

Moreover, the focusing element 45 is not limited to the focusing lens 45 including the tapered reflection surface 45b and the lens section 45c combined together, as illustrated in FIG. 7, but may alternatively be a focusing lens including a pin hole mask and a lens section combined together.

Embodiment 4

Figure 8:
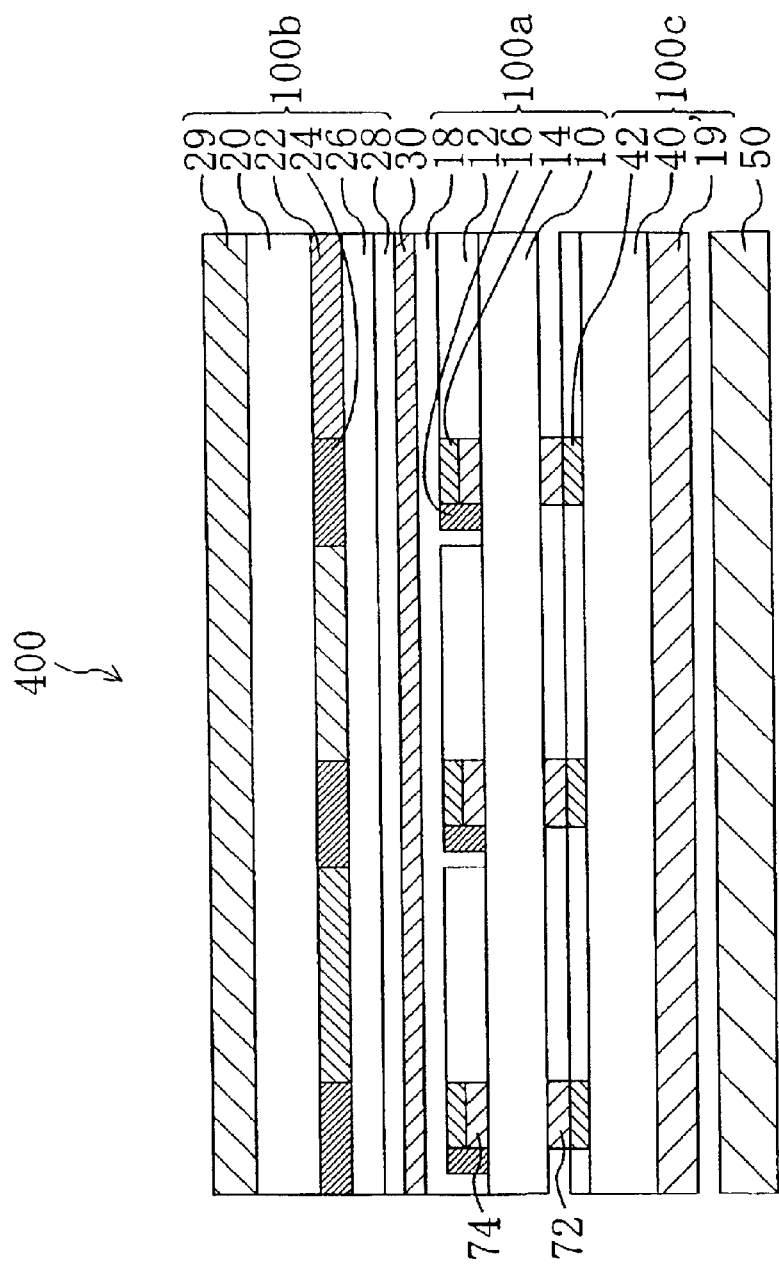
FIG. 8 is a cross-sectional view schematically illustrating a liquid crystal display device 400 of Embodiment 4 of the present invention.

FIG. 8 is a cross-sectional view schematically illustrating a liquid crystal display device 400 of Embodiment 4 of the present invention. In FIG. 8, elements having substantially the same functions as those of the liquid crystal display devices 200 and 300 of Embodiments 2 and 3 are denoted by the same reference numerals and will not be further described below.

The liquid crystal display device 400 of Embodiment 4 has a structure such that light emitted from the scanning signal light emitting element 42 is modulated into a predetermined polarized state, and substantially only light that is in the predetermined polarized state is incident on the optical switching element 14.

More specifically, the liquid crystal display device 400 includes a first polarizing element 72 provided between the optical switching element 14 and the scanning signal light emitting element 42, and a second polarizing element 74 provided between the first polarizing element 72 and the optical switching element 14. Moreover, a polarizing plate 19', i.e., one of the pair of polarizing plates 29 and 19' of the liquid crystal display device 400 that is on the side closer to the backlight 50, is provided on the back side of the substrate 100c.

The first polarizing element 72 modulates light emitted from the scanning signal light emitting element 42 into a predetermined polarized state. Moreover, the second polarizing element 74 is arranged so that light that is in the predetermined polarized state is selectively transmitted therethrough.

In the present embodiment, each of the first polarizing element 72 and the second polarizing element 74 is an absorption type polarizing element that transmits linearly-polarized light of a particular polarization direction while absorbing linearly-polarized light whose polarization direction is perpendicular to the particular polarization direction. The first polarizing element 72 and the second polarizing element 74 are arranged so that the transmission axis directions thereof are parallel to each other. Moreover, the first polarizing element 72 and the second polarizing element 74 are arranged so that the transmission axis directions thereof are perpendicular to the transmission axis direction of the polarizing plate 19' on the backlight side.

Light emitted from the scanning signal light emitting element 42 is polarized by the first polarizing element 72 into linearly-polarized light having a polarization direction that is parallel to the transmission axis direction of the first polarizing element 72. Since the transmission axis direction of the first polarizing element 72 and the transmission axis direction of the second polarizing element 74 are parallel to each other, the light, which has been polarized by the first polarizing element 72 into linearly-polarized light, is transmitted through the second polarizing element 74 to be incident on the optical switching element 14.

In contrast, light emitted from the backlight 50 is polarized by the polarizing plate 19' into linearly-polarized light having a polarization direction that is parallel to the transmission axis direction of the polarizing plate 19'. Since the transmission axis direction of the polarizing plate 19' and the transmission axis direction of the second polarizing element 74 are perpendicular to each other, the light, which has been emitted from the backlight 50 and transmitted through the polarizing plate 19', is absorbed by the second polarizing element 74 and will not be incident on the optical switching element 14.

As described above, the liquid crystal display device 400 of Embodiment 4 has a structure such that light emitted from the scanning signal light emitting element 42 is modulated into a predetermined polarized state, and substantially only light that is in the predetermined polarized state is incident on the optical switching element 14, whereby light from the backlight 50 is prevented from being incident on the optical switching element 14. Thus, the occurrence of a crosstalk phenomenon due to light from the backlight 50 is suppressed, and an image is displayed with a high quality.

As described above, in the liquid crystal display device 400 of the present embodiment, the occurrence of a crosstalk phenomenon is suppressed by using the polarization selectivity of a polarizing element, thereby providing a higher effect of suppressing the occurrence of a crosstalk phenomenon due to light from the backlight 50, as compared with a structure where the light blocking layer 41 is used, as in the liquid crystal display devices 100, 200 and 300 of Embodiments 1, 2 and 3.

Note that the first polarizing element and the second polarizing element are not limited to a polarizing element as illustrated in the present embodiment, but may alternatively be an absorption type polarizing element that contains a dye (e.g., iodine), or a reflection type polarizing element. Reflection type polarizing elements that can be used in the present invention include, for example, DBEF (manufactured by SUMITOMO 3M Limited), which transmits polarized light of a particular polarization direction while reflecting polarized light whose polarization direction is perpendicular to the particular polarization direction, or a polarizing element made of a cholesteric liquid crystal material, which only transmits either left or right circularly-polarized light while reflecting the other circularly-polarized light.

Moreover, in the liquid crystal display device 400 of Embodiment 4, the distance between the optical switching element 14 and the scanning signal light emitting element 42 may be set to be less than the pixel pitch as in the liquid crystal display device 100 of Embodiment 1; a louver may be provided between the optical switching element 14 and the scanning signal light emitting element 42 as in the liquid crystal display device 200 of Embodiment 2; or a focusing element may be provided between the optical switching element 14 and the scanning signal light emitting element 42 as in the liquid crystal display device 300 of Embodiment 3. With such a structure, it is possible not only to suppress the occurrence of a crosstalk phenomenon due to light from the backlight 50, but also to suppress the occurrence of a crosstalk phenomenon due to light that is emitted from a scanning signal light emitting element 42 and is incident on an unintended optical switching element 14 adjacent to an optical switching element 14 that is associated with the scanning signal light emitting element 42, whereby an image is displayed with an even higher quality.

Alternative Embodiments

Figure 9:
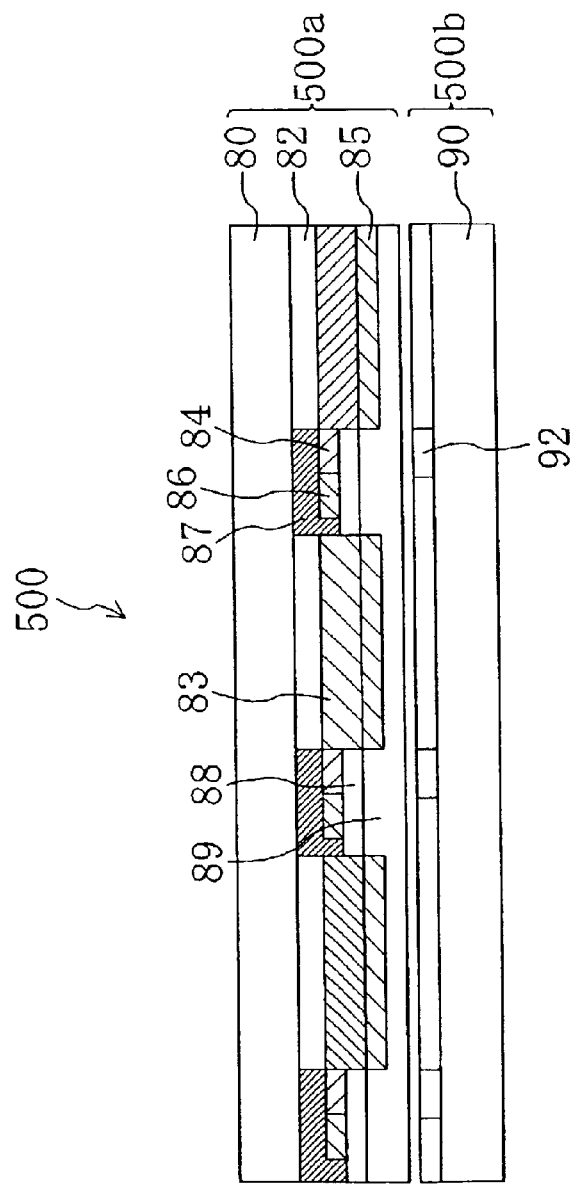
FIG. 9 is a cross-sectional view schematically illustrating an organic EL display device 500 of an alternative embodiment of the present invention.

While a liquid crystal display device including the liquid crystal layer 30 as a display medium layer has been described above in Embodiments 1, 2, 3 and 4, the present invention is not limited thereto. For example, the present invention can suitably be used with an organic EL display device 500 including an organic EL material layer (organic EL element) as illustrated in FIG. 9. FIG. 9 is a cross-sectional view schematically illustrating the organic EL display device 500, which is a display device of an alternative embodiment of the present invention.

The organic EL display device 500 includes a first substrate 500a and a second substrate 500b provided on the back side of the first substrate 500a.

The first substrate 500a includes a transparent substrate (e.g., a glass substrate or a polymer film) 80, a plurality of pixel electrodes 82, optical switching elements 84 electrically connected to the pixel electrodes 82, respectively, data signal lines 86 for supplying data signals to the optical switching elements 84, an organic EL material layer 83 provided on each pixel electrode 82, and a counter electrode (e.g., an aluminum layer) 85 opposing the pixel electrode 82 via the organic EL material layer 83. The pixel electrodes 82 are formed in a matrix pattern on the transparent substrate 80 by using a transparent conductive material (e.g., ITO).

The first substrate 500a further includes a light blocking layer 87 provided on the viewer side of the optical switching element 84, a transparent insulating layer (e.g., an $SiO_2$ layer having a thickness of about 150 nm) 88 provided on the optical switching element 84 and the data signal line 86, and a transparent conductive layer (e.g., an ITO layer) 89 provided so as to cover the transparent insulating layer 88 and the counter electrode 85. The counter electrodes 85 opposing the respective pixel electrodes 82 are electrically connected to one another by the transparent conductive layer 89, and together function as a single counter electrode opposing the pixel electrodes 82.

The second substrate 500b includes a transparent substrate (e.g., a glass substrate or a polymer film) 90, and scanning signal light emitting elements 92 provided on the transparent substrate 90. The scanning signal light emitting element 92 may be, for example, an organic EL element as illustrated in FIG. 2B to FIG. 2D.

Embodiments 1 to 3 of the present invention may also be used with the organic EL display device 500 illustrated in FIG. 9. For example, the distance between the optical switching element 84 and the scanning signal light emitting element 92 may be set to be less than the pixel pitch as in the liquid crystal display device 100 of Embodiment 1; a louver may be provided between the optical switching element 84 and the scanning signal light emitting element 92 as in the liquid crystal display device 200 of Embodiment 2; or a focusing element may be provided between the optical switching element 84 and the scanning signal light emitting element 92 as in the liquid crystal display device 300 of Embodiment 3. In such a case, light emitted from a scanning signal light emitting element 92 is prevented from being incident on an unintended optical switching element 84 adjacent to an optical switching element 84 that is associated with the scanning signal light emitting element 92, thereby suppressing the occurrence of a crosstalk phenomenon.

Moreover, in the organic EL display device 500 of the present embodiment, the light blocking layer 87 is provided on the viewer side of the optical switching element 84, whereby light emitted from the scanning signal light emitting element 92 to the optical switching element 84 is prevented from being transmitted to the viewer side. Thus, a reduction in the contrast ratio is suppressed.

Figure 10:
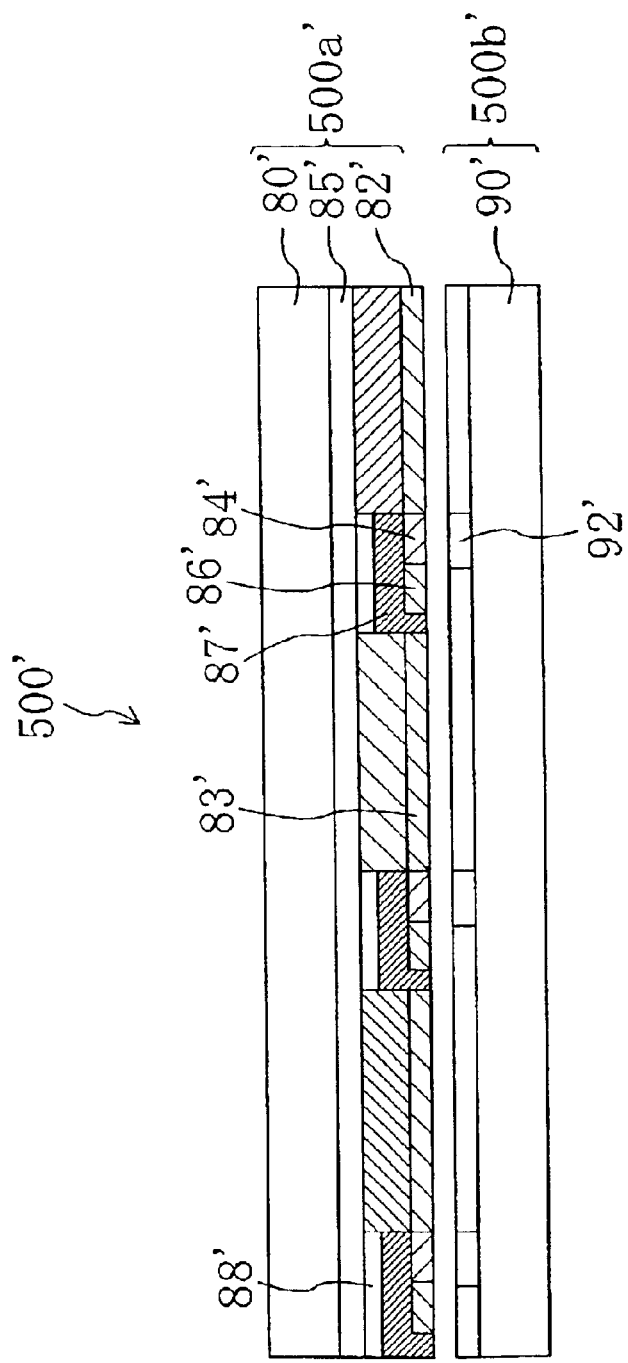
FIG. 10 is a cross-sectional view schematically illustrating an organic EL display device 500' of an alternative embodiment of the present invention.

Note that the organic EL display device with which the present invention can suitably be used is not limited to the organic EL display device 500 as illustrated in FIG. 9, but may alternatively be, for example, an organic EL display device 500' as illustrated in FIG. 10.

The organic EL display device 500' illustrated in FIG. 10 includes a first substrate 500a', and a second substrate 500b' provided on the back side of the first substrate 500a'.

The first substrate 500a' includes a transparent substrate (e.g., a glass substrate or a polymer film) 80', a single counter electrode 85' formed on the transparent substrate 80' by using a transparent conductive material (e.g., ITO), an organic EL material layer 83' provided on the counter electrode 85', a transparent insulating layer (e.g., an $SiO_2$ layer having a thickness of about 150 nm) 88' provided on the counter electrode 85', a plurality of pixel electrodes (e.g., an aluminum layer) 82' formed in a matrix pattern and opposing the counter electrode 85' via the organic EL material layer 83', optical switching elements 84' electrically connected to the pixel electrodes 82', respectively, and data signal lines 86' for supplying data signals to the optical switching elements 84'. The first substrate 500a' further includes a light blocking layer 87' provided on the viewer side of the optical switching element 84'.

The second substrate 500b' includes a transparent substrate (e.g., a glass substrate or a polymer film) 90', and scanning signal light emitting elements 92' provided on the transparent substrate 90'. The scanning signal light emitting element 92' may be, for example, an organic EL element as illustrated in FIG. 2B to FIG. 2D.

Embodiments 1 to 3 of the present invention may also be used with the organic EL display device 500' having such a structure so as to suppress the occurrence of a crosstalk phenomenon.

As described above, the present invention can suitably be used with liquid crystal display devices and organic EL display devices.

The thickness of an active matrix substrate of a liquid crystal display device is currently 500 μm to 700 μm, and the pixel pitch of a liquid crystal display device is currently 200 μm to 800 μm. Therefore, it is often the case with a liquid crystal display device that the distance between the optical switching element and the scanning signal light emitting element is equal to or greater than the pixel pitch. The occurrence of a crosstalk phenomenon can be suppressed by setting the distance between the optical switching element and the scanning signal light emitting element to be less than the pixel pitch, by providing a louver, or by providing a focusing element, as in Embodiments 1 to 3. Moreover, in some liquid crystal display devices, a backlight is provided on the back side of the device, whereby light from the backlight may be incident on the optical switching element. The occurrence of a crosstalk phenomenon due to light from a backlight can be suppressed by providing a light emitting layer on the backlight side of the scanning signal light emitting element as in Embodiments 1 to 3, or by utilizing the polarization selectivity of a polarizing element as in Embodiment 4.

On the other hand, in an organic EL display device, it may not be necessary to provide a substrate between scanning signal light emitting elements and optical switching elements. Therefore, it is easy to set the distance between the optical switching element and the scanning signal light emitting element to be less than 200 μm to 300 μm, i.e., a distance with which the occurrence of a crosstalk phenomenon is generally prevented and to be greater than about 1 μm at which a signal delay becomes problematic.

Note that while the description above has been directed to a case where dot-shaped scanning signal light emitting elements are provided, as illustrated in FIG. 2B to FIG. 2D, the present invention is not limited thereto, and any scanning signal light emitting element that emits dotted light may be used.

Figure 11A:
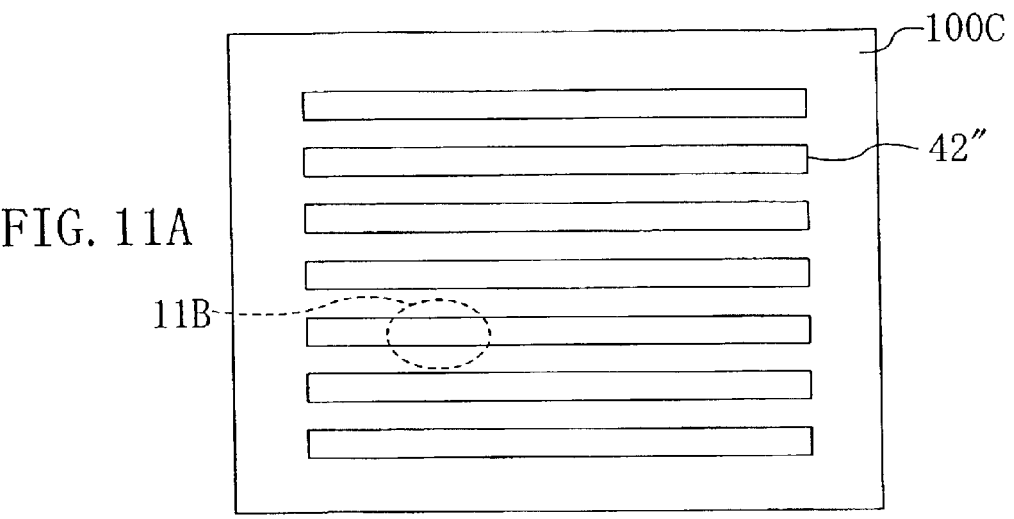
FIG. 11A is a plan view schematically illustrating a light guide element 42" for emitting dotted light.
Figure 11B:
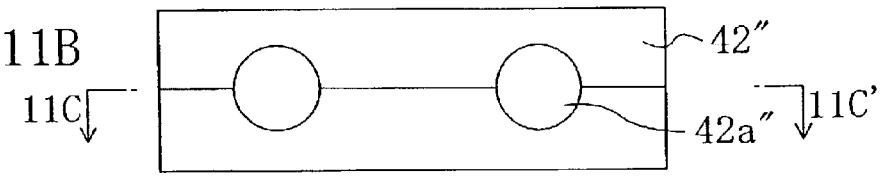
FIG. 11B is an enlarged view illustrating an area 11B encircled by a broken line in FIG. 11A.
Figure 11C:
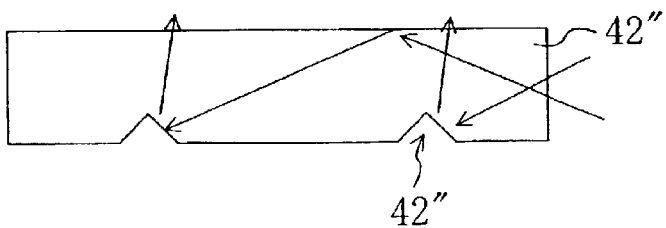
FIG. 11C is a cross-sectional view taken along line 11C–11C' in FIG. 11B.

For example, a scanning signal light emitting element that emits dotted light may be a combination of a light emitting element that emits light in a linear or planar pattern with a pin hole mask, or a combination of a light guide element 42" as illustrated in FIG. 11A, FIG. 11B and FIG. 11C with a light source.

FIG. 11A is a plan view schematically illustrating the light guide element 42", FIG. 11B is an enlarged view illustrating an area 11B encircled by a broken line in FIG. 11A, and FIG. 11C is a cross-sectional view taken along line 11C–11C' in FIG. 11B.

The light guide elements 42" are provided in a stripe pattern on the substrate 100c, as illustrated in FIG. 11A, and a light source (e.g., a cold-cathode tube; not shown) is provided at an end of each light guide element 42". As illustrated in FIG. 11B and FIG. 11C, the light guide element 42" includes depressions 42a", each of which is formed on the back side surface of the light guide element 42" in a dot-like shape so as to correspond to the optical switching element of each pixel. The shape of the depression 42a" is, for example, a conical shape as illustrated in FIG. 11B and FIG. 11C.

Light, which has been emitted from the light source and has entered the light guide element 42", travels through the inside of the light guide element 42" while being totally reflected repeatedly by the side surfaces of the light guide element 42", as illustrated in FIG. 11C. Some of the light traveling through the inside of the light guide element 42" is reflected by the depression 42a". Such light is incident on the viewer-side side surface at an angle such that the light is not totally reflected, and thus comes out of the light guide element 42". In this way, the light guide element 42" functions as a scanning signal light emitting element that emits dotted light, as scanning signals, to the optical switching elements.

Moreover, while the description above has been directed to a case where scanning signal light emitting elements are provided on a substrate that is different from a substrate on which optical switching elements are provided, the present invention is not limited to this arrangement of the scanning signal light emitting elements. For example, the scanning signal light emitting elements may alternatively be provided on the same substrate on which the optical switching elements are provided, but on a side of the substrate on which the optical switching elements are not provided.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention that fall within the true spirit and scope of the invention.

What is claimed is:

1. A display device, comprising:

a plurality of pixel electrodes defining a plurality of pixels that are arranged in a matrix pattern;

optical switching elements electrically connected to the plurality of pixel electrodes, respectively; and scanning signal light emitting elements for emitting dotted light, as scanning signals, to the optical switching elements, wherein a distance between the optical switching element and the scanning signal light emitting element is less than a pixel pitch at which the plurality of pixels are arranged.

2. The display device of claim 1, further comprising:

a backlight provided on a side away from the optical switching element with respect to the scanning signal light emitting element; and a light blocking layer provided on a side of the scanning signal light emitting element that is closer to the backlight.

3. The display device of claim 1, wherein light emitted from the scanning signal light emitting element is modulated into a predetermined polarized state, and substantially only light that is in the predetermined polarized state is incident on the optical switching element.

4. The display device of claim 3, further comprising:

a first polarizing element provided between the optical switching element and the scanning signal light emitting element for modulating light emitted from the scanning signal light emitting element into the predetermined polarized state; and a second polarizing element provided between the first polarizing element and the optical switching element and arranged so as to selectively transmit light that is in the predetermined polarized state.

5. The display device of claim 1, further comprising:

at least one counter electrode opposing the plurality of pixel electrodes; and a liquid crystal layer provided between the plurality of pixel electrodes and the at least one counter electrode.

6. The display device of claim 1, further comprising:

at least one counter electrode opposing the plurality of pixel electrodes; and an organic electroluminescence material layer provided between the plurality of pixel electrodes and the at least one counter electrode.

7. The display device of claim 6, further comprising a light blocking layer provided on a viewer side of the optical switching element.

8. The display device of claim 1, wherein the scanning signal light emitting element is formed in a dot-like shape.

* * * * *